R. B. THOMPSON.
NON-SKIDDING TIRE ARMOR.
APPLICATION FILED DEC. 30, 1916.
1,242,078.
Patented Oct. 2, 1917.
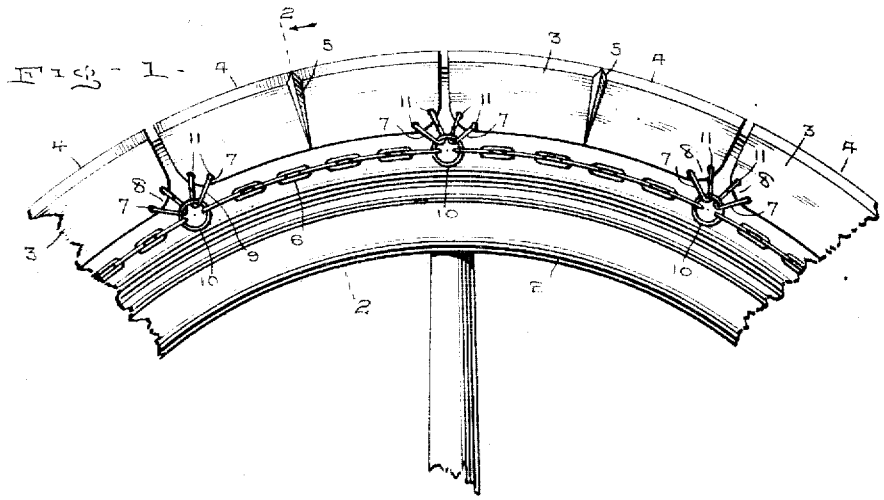
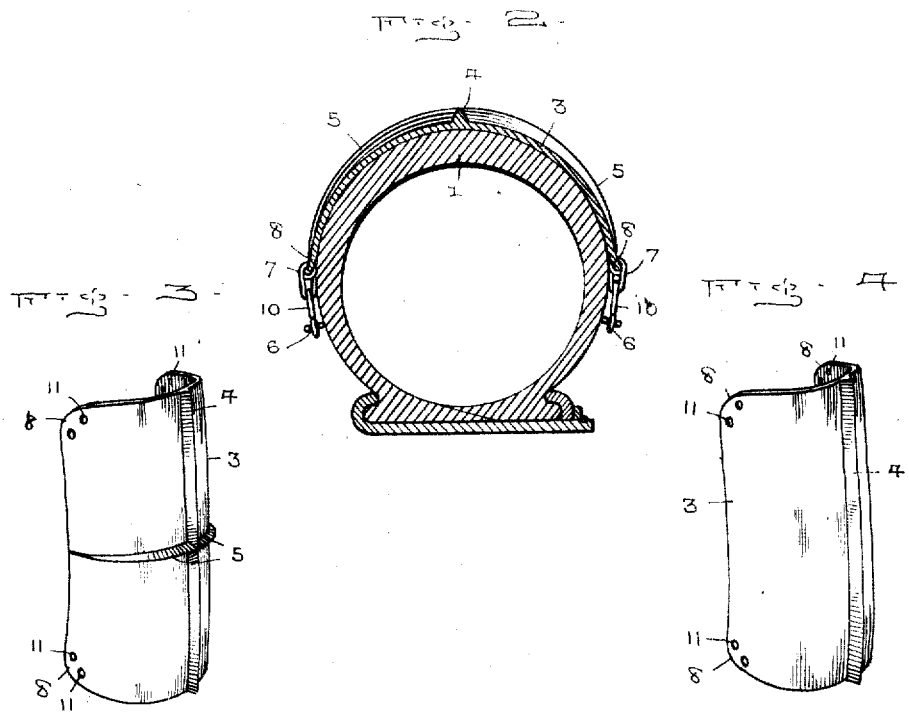
Inventor
R. B. Thompson
By W. J. FitzGerald & Co.
Attorneys

UNITED STATES PATENT OFFICE.

RICHARD BRUCE THOMPSON, OF ALLERTON, ILLINOIS.

NON-SKIDDING TIRE-ARMOR.

1,242,078.          Specification of Letters Patent.          Patented Oct. 2, 1917.

Application filed December 30, 1916. Serial No. 139,714.

*To all whom it may concern:*

Be it known that I, RICHARD B. THOMPSON, a citizen of the United States, residing at Allerton, in the county of Vermilion and State of Illinois, have invented certain new and useful Improvements in Non-Skidding Tire-Armors; and I do hereby declare the following to be a full, clear, and exact description of the invention, such as will enable others skilled in the art to which it appertains to make and use the same.

This invention relates to non-skidding tire armors and has for its principal object to provide means of this character which when applied to the tread of an automobile or other vehicle wheel tread, will prevent the wheel from skidding upon slippery surfaces, such as snow, ice or wet streets.

Another object of the invention is to provide a tire armor embodying a plurality of tread plates which are attached to circumferential retaining chains arranged on opposite sides of the wheel tire, each of said tread plates being provided with anti-skid ribs.

A further object of the invention is to provide each tread plate with a longitudinally extending rib and a transversely extending rib, the former serving to prevent the wheel from skidding sidewise, while the latter serves to provide a foot hold or traction for the wheel.

A still further object of the invention is to make each of these ribs V shaped so that they will effectively bite into the surface of the street or road and at the same time prevent mud, snow or other foreign matter from caking or packing upon the tread surface of each of the tread plates.

With these and other objects in view as will appear as the description proceeds, the invention comprises the various novel features of construction, combination and arrangement of parts as will be more fully described hereinafter and set forth with particularity in the appended claims.

Referring to the drawings,

Figure 1 is a side elevation of a portion of a pneumatic tired wheel showing a portion of my improved non-skidding tire armor arranged in position thereon.

Fig. 2 is a vertical transverse sectional view taken on the line 2—2 of Fig. 1.

Fig. 3 is a detail perspective view of one of the tread plates, and

Fig. 4 is a detail perspective view of a slightly different form of tread plate.

Similar characters of reference are used to denote like parts throughout the accompanying drawings and the following description.

Referring more particularly to the drawings, the reference numeral 1 indicates a pneumatic tire casing that is supported upon the vehicle wheel 2. Arranged upon the outer or tread surface of the tire casing 1 is a plurality of circumferentially disposed tread plates 3. These tread plates as shown and described in my preferred construction are designed for use upon the rear wheels of a motor vehicle, those plates that are used for the front wheels being slightly different in construction as shown in Fig. 4 of the drawings.

Each of these tread plates 3 as shown is elongated and substantially semi-circular in cross section as clearly shown in Figs. 2 and 3.

Extending longitudinally of each tread plate and disposed centrally between the opposite longitudinal side edges is a V-shaped rib 4 which extends from one end of the plates to the other. A similar V-shaped rib 5 is disposed between the opposite ends of the tread plate and extends transversely of the outer surface of the tread plate. This transversely extending rib 5, as clearly shown in Figs. 2 and 3 of the drawings, diminishes from a point central of the tread plate, or the intersection of the transverse rib with the longitudinal rib, to the opposite longitudinal side edges of the tread plate, and terminates in a point at this place. By making each of these ribs V-shaped and of the particular construction just described, it will be apparent that the knife edge formed by the longitudinally extending V-shaped rib will effectively bite into the surface upon which the vehicle is traveling and prevent sidewise skidding of the vehicle. The transverse V-shaped rib 5 will serve somewhat to prevent sidewise skidding, but will mainly serve to bite into the surface upon which the vehicle is traveling in order to provide an effective foot hold or traction for the vehicle wheel.

It will also be noted that by reason of these ribs being V-shaped that mud, snow and other foreign material will be prevented from caking or packing upon the tread plates against these ribs, as these foreign materials will slide off of the inclined surfaces of the ribs upon the tread plates.

The tread plates 3 are connected at their opposite corners to two circumferential extending retaining chains 6, that are disposed on opposite sides of the tire casing 1, through the medium of suitable links 7. The corners of the tread plates are bent or flared slightly outwardly as at 8 so as to support the links 7 substantially out of contact with the outer circumference of the tire casing. By this means the links 7 will be prevented from materially rubbing or injuring the sides of the tire casing.

Any construction of link 7 may be used, but each of those shown in this instance and for the purpose of illustration is shown to consist of a single strand of wire 9 which is looped through one of the links or rings 10 of one of the retaining chains 6 and has its opposite ends oppositely coiled and inserted through the apertures 11 in the adjacent outwardly flared end 8 of the tread plate.

From this construction it will be apparent that when the tread plates are arranged circumferentially of the casing tread and the retaining chains 6 on the opposite sides thereof securely tightened, that each of the tread plates will be held in spaced relation circumferentially of the tire casing and will serve to effectively prevent skidding of the wheel sidewise and at the same time provide an effective foot hold for it.

In the construction of non-skidding tire armor that I propose to use for the front wheels of the vehicle, I construct them as shown in Fig. 4 with a single longitudinally extending V-shaped rib 4, the transversely extending V-shaped rib being omitted, as it is not necessary. However, if desired the same kind of plates that are used upon the rear wheels may be used upon the front wheels when the occasion demands.

What I claim is:

1. The combination with a tired vehicle wheel, of a non-skidding tire armor comprising a plurality of elongated concaved tread plates, each tread plate having each of its corners provided with a pair of apertures, a pair of flexible circumferential elements, and links looped through said flexible circumferential elements and having their terminal ends engaged through said pairs of apertures.

2. The combination with a tired vehicle wheel, of a non-skidding tire armor comprising a plurality of elongated concaved tread plates, each tread plate having each of its corners provided with a pair of apertures, a pair of flexible circumferential elements, each embodying a plurality of spaced rings, and links looped through the rings of said flexible circumferential elements and having their terminal ends engaged within said pairs of apertures of the tread plates.

3. The combination with a tired vehicle wheel, of a non-skidding tire armor comprising a plurality of elongated concaved tread plates, each tread plate having each of its corners out-turned and provided with a pair of apertures, a pair of flexible circumferential elements, each circumferential element embodying a plurality of spaced rings, and a pair of links looped through each ring and having their terminal ends connected to and looped through the pairs of apertures in the out-turned corners of the adjacent tread plates.

In testimony whereof I have signed my name to this specification in the presence of two subscribing witnesses.

RICHARD BRUCE THOMPSON.

Witnesses:
 A. E. THOMPSON.
 W. B. THOMPSON.